(12) United States Patent
Christopher

(10) Patent No.: US 8,100,048 B2
(45) Date of Patent: Jan. 24, 2012

(54) PINLESS PISTON AND CONNECTING ROD ASSEMBLY

(75) Inventor: Bartholomew Christopher, Ypsilanti, MI (US)

(73) Assignee: Federal-Mogul Corporation, Southfield, MI (US)

( * ) Notice: Subject to any disclaimer, the term of this patent is extended or adjusted under 35 U.S.C. 154(b) by 588 days.

(21) Appl. No.: 12/244,355

(22) Filed: Oct. 2, 2008

(65) Prior Publication Data

US 2009/0084260 A1 Apr. 2, 2009

Related U.S. Application Data

(60) Provisional application No. 60/976,843, filed on Oct. 2, 2007.

(51) Int. Cl.
*F16J 1/14* (2006.01)
(52) U.S. Cl. ........................................ 92/187
(58) Field of Classification Search .................. 92/155, 92/187, 188
See application file for complete search history.

(56) References Cited

U.S. PATENT DOCUMENTS

| | | | |
|---|---|---|---|
| 1,756,761 | A | 4/1930 | Reid |
| 3,564,978 | A | 2/1971 | Flitz |
| 3,765,307 | A | 10/1973 | Neel, Jr. |
| 3,877,350 | A | 4/1975 | Earley et al. |
| 3,903,752 | A | 9/1975 | Riffe |
| 5,492,052 | A | 2/1996 | Junge |
| 6,526,847 | B1 | 3/2003 | Yaroslavtsev |
| 7,127,981 | B2 | 10/2006 | Endoh et al. |

*Primary Examiner* — Michael Leslie
(74) *Attorney, Agent, or Firm* — Robert L. Stearns; Dickinson Wright, PLLC

(57) ABSTRACT

A piston extends along a central axis with an upper crown and a boss depending from the crown. The boss has opposite sides extending along opposite sides of the central axis to a free end and an annular pocket extending laterally into at least one of the sides. The boss further includes an opening extending through the free end into the pocket. The opening has a width extending from the side in which the pocket extends toward the other side of the boss. An assembly including the piston further includes a connecting rod terminating at a small end configured for receipt in the pocket with a shank extending from the small end. The small end can be provided with an external bearing material on a convex outer surface, and the small end is unobstructed from lateral movement along the opening over a full stroke of the piston.

23 Claims, 3 Drawing Sheets

PINLESS PISTON AND CONNECTING ROD ASSEMBLY

CROSS-REFERENCE TO RELATED APPLICATIONS

This application claims the benefit of U.S. Provisional Application Ser. No. 60/976,843, filed Oct. 2, 2007, which is incorporated herein by reference in its entirety.

BACKGROUND OF THE INVENTION

1. Technical Field

This invention relates generally to internal combustion engines, and more particularly to piston and connecting rod assemblies therefor.

2. Related Art

It is known that internal combustion engines have piston and connecting rod assemblies requiring use of a wrist pin for operable connection of a small end of the connecting rod to the piston. In particular, piston constructions are known to include a piston body with a pair of pin bosses depending from a crown of the body to a pair of axially aligned pin bores spaced laterally from one another. To transmit rotational motion to linear motion of the piston, a large end of a connecting rod is attached to a crank shaft of the engine and a small end of the connecting rod is received between the pin bosses for operable attachment to the piston via a wrist pin. To facilitate reducing friction between the wrist pin and the pin bores, it is known to insert journal bearings within the pin bores. Although these piston and connecting rod assemblies are widely accepted and useful, continual efforts are made to attain certain goals, for example, to reduce weight, to reduce envelope size, to improve manufacturing efficiencies and to reduce component costs.

Pistons are known that eliminate the need for a wrist pin connection between the connecting rod and the piston body. These piston constructions provide direct attachment of the piston body to the connecting rod. The piston has a single boss depending from the crown of the piston body with a single bore formed adjacent the end of the boss. A journal bearing is disposed within the bore and a slot depends from the bore with keyway formed through one sidewall of the boss. The connecting rod is constructed generally the same as in a conventional piston, with a shank extending to a small end. The small end, however, rather than providing a wrist pin bore, has an outer surface that extends laterally outwardly from sides of the shank to provide a cylindrical surface for receipt in the journal bearing. For assembly, the shank slides through the keyway in one sidewall of the boss while being obstructed by a wall at the opposite sidewall.

A piston constructed in accordance with this invention, while also eliminating the need for a wrist pin, provides further advancement in the attainment of the goals mentioned above, in addition to others that will be readily recognized by those skilled in the art of piston assemblies.

SUMMARY OF THE INVENTION

A piston and connecting rod assembly includes a piston body extending along a central axis with an upper crown and a boss depending from the crown along the central axis. The boss has opposite sides extending along opposite sides of the central axis to a free end and an annular pocket extending laterally into at least one of the sides. The boss further includes an opening extending through the free end into the pocket. The opening has a width extending from the side of the boss in which the pocket extends toward the other side of the boss. The assembly further includes a connecting rod terminating at a small end configured for receipt in the pocket with a shank extending from the small end to another end configured for operable attachment to a crankshaft. The small end is unobstructed from lateral movement along the opening over a full stroke of the piston.

In accordance with another aspect of the invention, a piston and connecting rod assembly includes a piston body extending along a central axis with an upper crown and a boss depending from the crown along the central axis. The boss has opposite sides extending along opposite sides of the central axis to a free end and an annular pocket extending laterally into at least one of the sides of the boss. The assembly further includes a connecting rod terminating at a small end having a convex outer surface configured for receipt in the pocket with a shank extending from the small end to another end configured for operable attachment to a crankshaft. The convex outer surface of the small end has a bearing material thereon.

In accordance with yet another aspect of the invention, a piston has a piston body that extends along a central axis with an upper crown and a boss depending from the crown along the central axis. The boss has opposite planar sides extending along opposite sides of the central axis to a free end and an annular pocket extending laterally along a horizontal axis into at least one of the sides of the boss. The boss further has an opening extending through the free end into the pocket. The opening has a width extending from the side in which the pocket extends toward the other side of the boss. The width of the opening is sized to provide unobstructed lateral movement of a connecting rod along the opening over the full range of oscillation of the connecting rod during a full stroke of the piston.

According to another presently preferred aspect of the piston and connecting rod assembly, one of the sides of the boss forms a wall to substantially close off a base of the pocket. Accordingly, the small end of the connecting rod is prevented from moving laterally through the pocket.

A piston and connecting rod assembly manufactured in accordance with the present invention, among other things that will be readily recognized by one of ordinary skill in the art of pistons, reduces the number of components in the piston assembly, reduces the cost associated with the manufacture and assembly of the piston assembly, reduces the compression height of the piston assembly, decreases the reciprocating mass of the piston assembly, and provides the piston assembly and associated components with a long and useful life.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PREFERRED EMBODIMENTS

Figure 2:
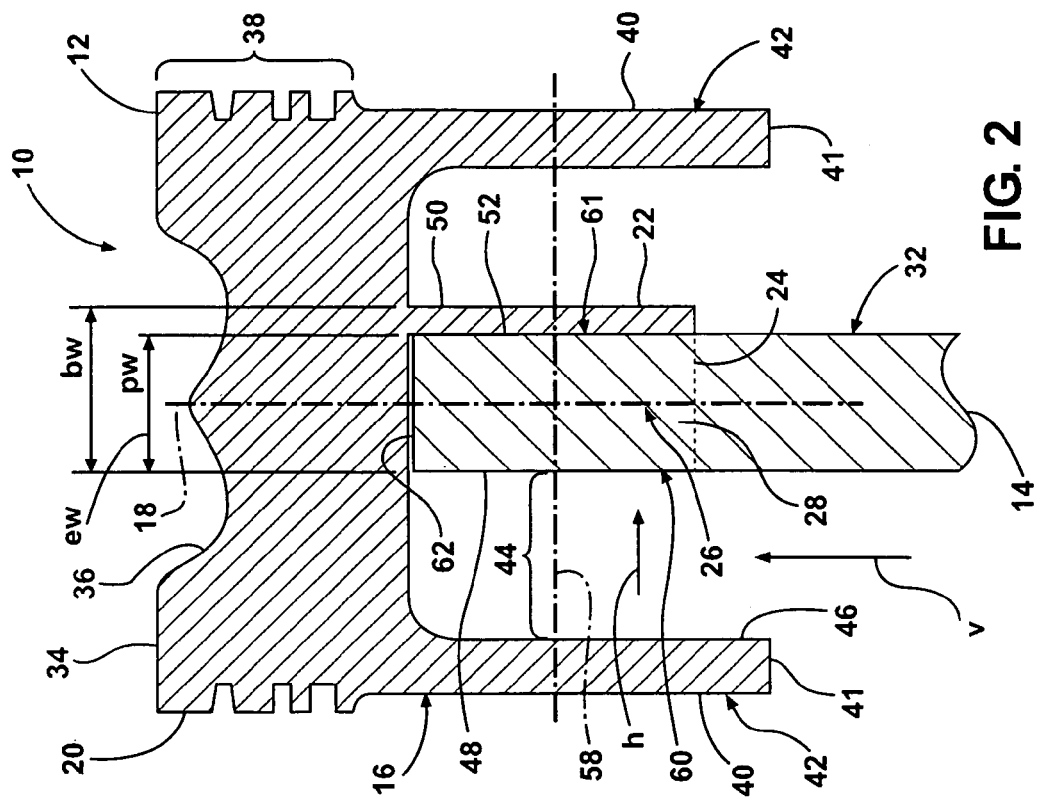
FIG. 2 is a cross-sectional view taken generally along the line 2-2 of FIG. 1.
Figure 1:
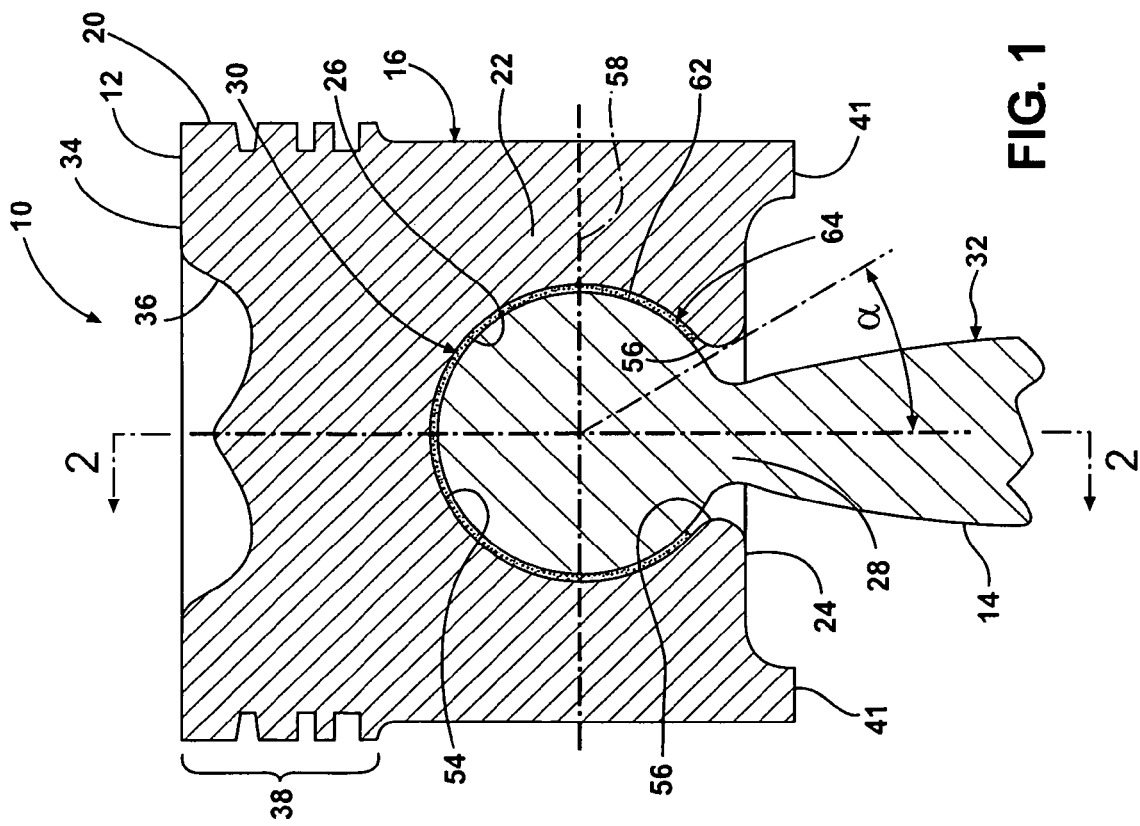
FIG. 1 is a fragmentary cross-sectional side view of a piston and connecting rod assembly constructed according to one presently preferred embodiment of the invention.

Referring in more detail to the drawings, FIGS. 1 and 2 illustrate a two-piece piston and connecting rod assembly shown generally at 10 constructed in accordance with one presently preferred embodiment of the invention. The piston and connecting rod assembly 10 includes a piston 12 and a connecting rod 14 configured for operable attachment to one another without a wrist pin. The piston 12 has a body 16, either cast or forged, extending along a longitudinal central axis 18 along which the piston 12 reciprocates in a cylinder bore (not shown). The body 16 is represented, by way of example and without limitation, as having an upper crown 20 with a single boss 22 depending therefrom to a free end 24. The boss 22 has a housing, shown here as a recessed pocket 26 adjacent its free end 24, wherein the pocket 26 partially penetrates or breaks through the free end 24 to provide an opening 28 therethrough. The connecting rod 14 has an end or small end 30 sized for receipt in the pocket 26 and a shank 32 extending from the small end 30 to another end (not shown) configured for operable attachment to a crankshaft (not shown). As such, the piston 12 is attached to the crankshaft 14 without a pin connection.

The upper crown 20 of the piston 12 is represented here as having an upper surface 34 with a combustion bowl 36 recessed therein, as is known in piston head constructions; however, the piston 12 could have an otherwise substantially flat upper surface, if desired. An outer wall or ring belt 38 extends downwardly from the upper surface 36, with at least one annular ring groove being formed in the ring belt 38 for floating receipt of a piston ring (not shown). A pair of skirt portions 40 (FIG. 2) depend from the upper crown 20 to free ends 41, shown here as depending axially beyond the free end 24 of the boss 22. The skirt portions 40 have outer surfaces 42 generally conforming with the inner surface of the cylinder bore to facilitate guiding the piston 12 during reciprocation within the cylinder bore. At least one of the skirt portions 40 is spaced sufficiently radially outwardly from pocket 26 of the boss 22 to provide a space 44 between the pocket 26 of the boss 22 and an inner surface 46 of the respective skirt portion 40 to allow receipt of the end 30 of the connecting rod 14 therein during assembly, as discussed in more detail below.

As shown in FIG. 2, the boss 22 has opposite sides 48, 50 that extend along and generally parallel to the longitudinal central axis 18 on opposite sides thereof to its free end 24. The sides 48, 50 of the boss 22 are generally planar and establish a width (bw) that is slightly offset relative to the longitudinal central axis 18 so that a larger portion of the width bw of the boss 22 is on one side of the axis 18 than on the opposite side. The recessed annular pocket 26 extends laterally into one of the sides 48 of the boss 22 a predetermined distance to provide a width (pw) of the pocket 26 that is less than the width (bw) of the boss 22. As such, the pocket 26 has a base or sidewall 52 formed by the side 50 of the boss 22. Unlike the boss 22, the pocket width (pw) is established so that it is bisected or substantially bisected by the longitudinal central axis 18. Accordingly, equal portions of the pocket width pw are symmetrically arranged on opposite sides of the longitudinal central axis 18.

As shown in FIG. 1, the pocket 26 has a concave, circumferentially extending, cylindrical inner surface 54 that is interrupted at the free end 24 by the opening 28. The opening 28 is bounded by opposite side edges 56 that are spaced equally from the longitudinal central axis 18 such that the width of the opening 28 is constant or substantially constant. The side edges 56 are spaced sufficiently from one another to provide the opening 28 with sufficient space to allow the required degree of unobstructed oscillation of the connecting rod shank 32 over a full stroke of the piston 12 during reciprocation of the piston 12.

The pocket 26 has a horizontally extending central axis 58 that is generally perpendicular to and intersects the longitudinal central axis 18. The concave inner surface 54 of the pocket 26 extends continuously at a constant radius, without interruption, a full 180 degrees above the central axis 58, while the inner surface 54 continues at the constant radius below the central axis 58 until it is interrupted at the free end 24 by the opening 28. In one construction of the inner surface 54, if an imaginary arc of the constant radius were continued from the central axis 58 across the opening 56, the imaginary arc would extend below the free end 24 of the boss 22.

The small end 30 of the connecting rod 14 has opposite sides 60, 61 that establish a width (ew) with a convex outer surface 62 configured for close sliding receipt in the pocket 26 being formed across the width (ew). The width (ew) of the small end 30 in this embodiment is less than the width of the space 44 between the inner surface 46 of the skirt portion 40 and the side 48 of the boss 22. Thus, the small end 30 can be inserted within the space 44 vertically along the direction of arrow (v) and then translated horizontally along the axis 58 in the direction of arrow (h) into the pocket 26. The width (ew) of the small end 30 can be configured to be the same as, or substantially the same as, the width (pw) of the pocket 26. As such, the side 48 of the boss 22 and the exposed side 60 of the small end 30 are substantially flush with one another upon assembling the connecting rod 14 within the boss 22. The shank 32 of the connecting rod 14 can also be provided having the same width (ew) as the small end 30. Therefore, the connecting rod 14 can be provided having a constant or substantially constant width along its length. Accordingly, the longitudinal central axis 18 bisects or substantially bisects the connecting rod 14, thereby providing a balanced assembly.

The contours of the connecting rod outer surface 62 and the pocket inner surface 54 are configured for relative oscillation with one another over a predetermined angle of oscillation (α) (FIG. 1). To facilitate reduced friction during oscillation, a bearing material 64 can be provided on the convex outer surface 62 of the small end 30 of the connecting rod 14. The bearing material 64 can be any suitable material, and can be impregnated, coated, or otherwise applied to the small end 30, and could otherwise be provided as a preformed journal bearing that is cut and press on the end 30. As such, rather than applying a bearing material within the pocket 26, the bearing material 64 is applied directly to the connecting rod 14. Of course, it should be recognized that a bearing material could be applied within the pocket 26, if preferred for the intended application.

The piston and connecting rod assembly 10, among those things already discussed above, benefits from a reduced compression height, which is measured from the horizontal central axis 58 to the upper surface 34 of the piston body 16.

Figure 3:
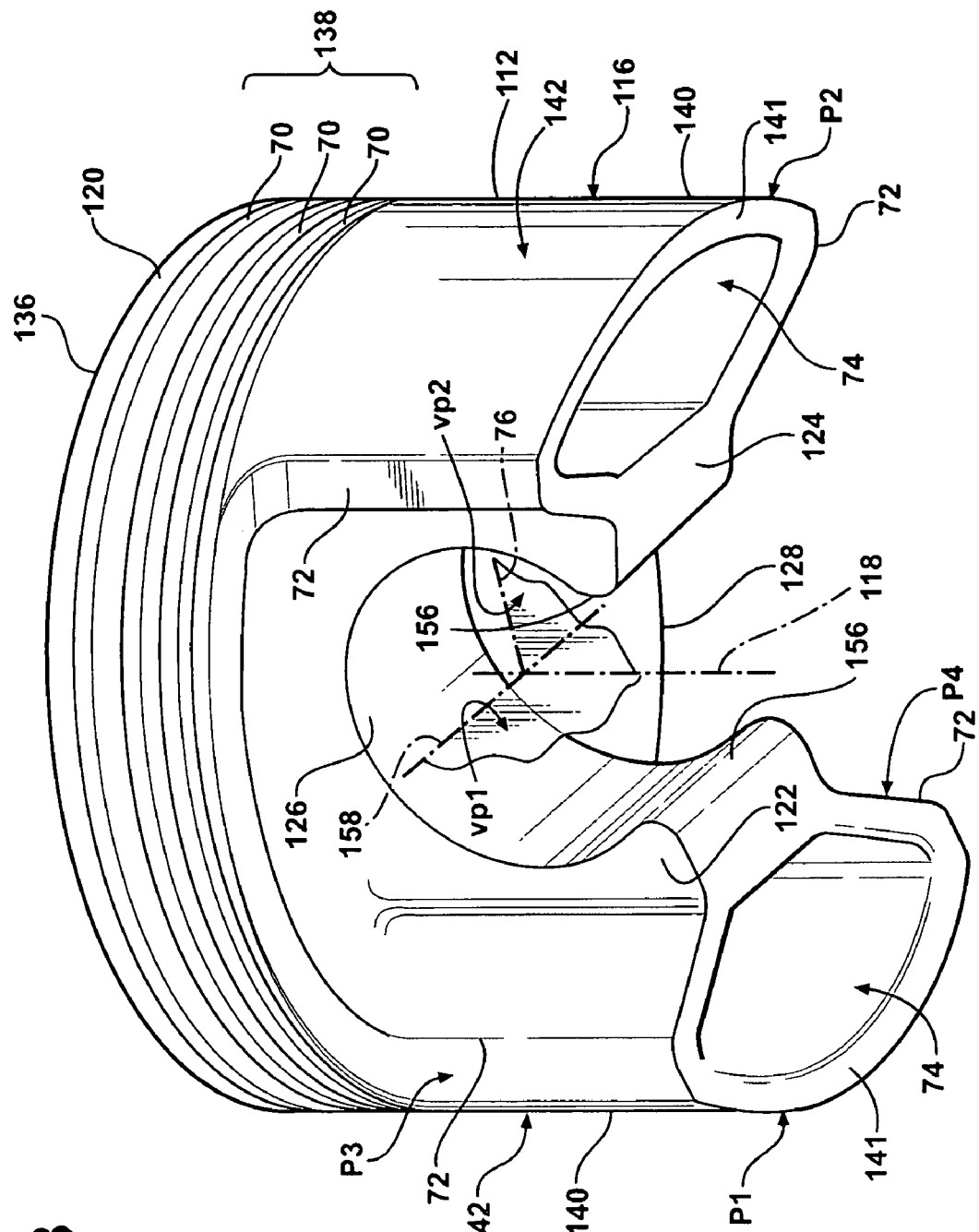
FIG. 3 is a bottom perspective view of a piston constructed according to another embodiment of the invention.
Figure 4:
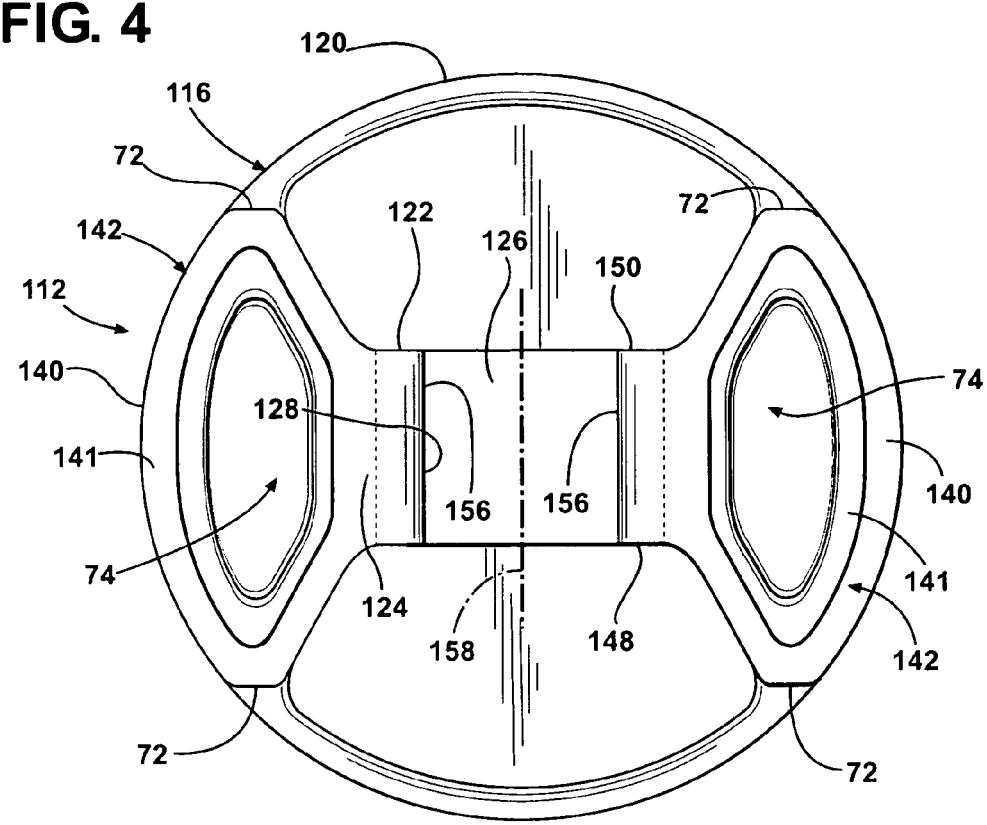
FIG. 4 is a bottom perspective view of the piston of FIG. 3.
Figure 5:
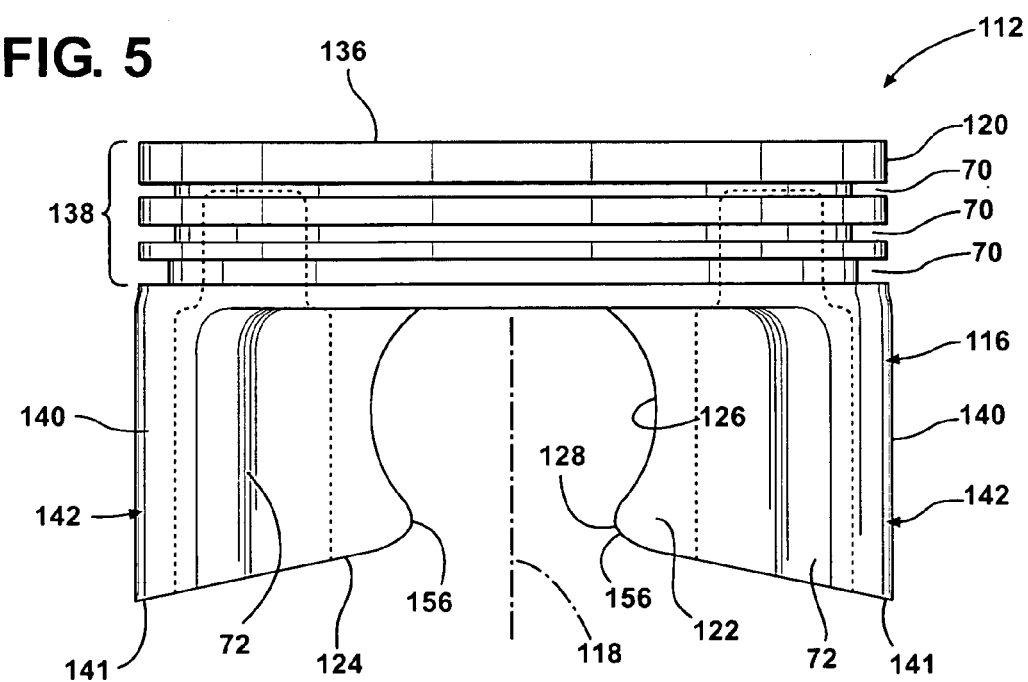
FIG. 5 is a side elevation view of the piston of FIG. 3.

FIGS. 3-5 illustrate a piston 112 constructed according to another presently preferred embodiment, wherein similar reference numerals offset by a factor of 100 are used to identify similar features as described for the piston 12 above. The piston 112 has a body 116 extending along a longitudinal central axis 118 along which the piston 112 reciprocates in a cylinder bore (not shown). The body 116 has an upper crown 120 and a single boss 122 depending therefrom along the central axis 118 to a free end 124. The boss 122 has opposite sides 148, 150 that extend along and generally parallel to the longitudinal central axis 118 on opposite sides thereof to its free end 124. The boss 122 has a connecting rod housing, referred to hereafter as bearing pocket or pocket 126, that is formed as a through bore extending between and completely through the sides 148, 150 of the boss 122 adjacent the free end 124. The pocket 126 extends along a horizontally extending central axis 158 that is generally perpendicular to and intersects the longitudinal central axis 118. An opening 128 extends into the free end 124 and into the pocket 126, as described above with regard to the pocket 26, so that an end of a connecting rod (not shown) can be disposed for oscillation in the pocket 126 to provide a two-piece piston assembly. The opening 128 is sized and bounded by opposite side edges 156 to retain the end of the connecting rod in the bore 126 during the down-stroke, while the entire width of the opening 128 extending across the opposite sides 148, 150 allows the connecting rod to oscillate over its full range of oscillation throughout a full stroke of the piston 112 in use.

The upper crown 120 of the piston 112 has an outer wall or ring belt 138 that extends downwardly from an upper surface 136, with at least one, and shown here as a plurality of annular grooves 70 being formed in the ring belt 138 for floating receipt of at least one piston ring (not shown). A pair of skirt portions 140 depend from the upper crown 120 to free ends 141, shown here as depending generally equidistant to the free end 124 of the boss 122. The skirt portions 140 have outer surfaces 142 generally conforming with the cylinder bore to facilitate guiding the piston 112 during reciprocation with the cylinder bore.

Each of the skirt portion outer surfaces 142 extends partially about the circumference of the piston 112 on diametrically opposite sides of the horizontal central axis 158. The outer surfaces 142 merge with walls 72 that extend radially inwardly therefrom, wherein the walls 72 are attached to the centrally located boss 122. As such, the diametrically opposite outer surfaces 142, the respective walls 72 and the boss 122 provide diametrically opposite hollowed cavities 74 that extend substantially from the free ends 141 of the skirts portions 140 upwardly toward the upper crown 120. The cavities 74, as shown in FIG. 4, are generally oblong and can be formed to extend at least partially into the upper crown 120 and aligned radially inwardly from the grooves 70. As such, the cavities 74 can facilitate cooling the upper crown 120 in a cocktail-shaker fashion via oil splashing from below the piston 112 upwardly into the cavities 74. Further, the hollowed cavities 74 provide a significant weight reduction to the piston 112, while also improving the ease of manufacture.

As shown in FIG. 3, the piston 112 is symmetrical across opposite sides of a vertical plane (VP1) extending along and through the longitudinal central axis 118 and along and through the horizontal central axis 158. Accordingly, the plane VP1 bisects the pocket 126 to form mirrored piston halves P1, P2. As such, the piston 112 is completely balanced across opposite sides of the plane VP1. In addition to being symmetrical across the vertical plane VP1, the piston 112 is symmetrical across opposite sides of a vertical plane (VP2) extending along and through the longitudinal axis 118 and along and through an axis 76, wherein the axis 76 extends perpendicularly to the horizontal axis 158 and the vertical central axis 118. As such, the plane VP2 is perpendicular to the plane VP1. Accordingly, the plane VP2 bisects the pocket 126 and the cavities 74 to form mirrored piston halves P3, P4. Of course, it should be recognized that symmetrically oriented or asymmetrically oriented oil flow passages could be formed to facilitate lubrication of the pocket 126, such as, for example, by extending oil flow passages from the pocket 126 into one or both of the cavities 74.

With the piston 112 having symmetrically or substantially symmetrically mirror halves on opposite sides of the planes VP1, VP2, the reciprocation of the piston 112 within the cylinder bore produces minimal friction against the cylinder bore. This results in part from the reciprocating mass being balanced, and in part from the thermal expansion of the piston 112 being uniform in use. For example, testing has shown that the piston body 116 is caused to bend slightly generally about the horizontal axis 158 as the upper crown 120 is heated in use, such that the skirt portions 140 move radially inwardly toward one another in the region of the free ends 141. As such, in use and during high heat conditions, the opening 128 is caused to be slightly reduced by the side edges 156 moving slightly toward one another, and thus, the diameter of the pocket 126 is caused to be slightly reduced. With the piston 112 being symmetrical across the plane VP1, the reduction to the diameter of the pocket 126 is uniform across its width extending along the central axis 158. Therefore, the pocket 126 provides a uniform cylindrical bearing surface along its length against which the end of the connecting rod oscillates, thus, facilitating the production of a uniform hydrodynamic oil film between the pocket 126 and the small end of the connecting rod. Of course, as noted above with regard to the assembly 10, the small end of the connecting rod can be provide with an external bearing surface or material to facilitate maintaining a good lubrication layer between the pocket 126 and the small end of the connecting rod.

It is to be understood that other embodiments of the a piston and the piston-connecting rod assembly, other than those specifically illustrated in the drawings or discussed above, which accomplish the same function, are contemplated and incorporated herein within the scope of any ultimately allowed patent claims.

What is claimed is:

1. A piston and connecting rod assembly, comprising:
   a piston body having an upper crown and a boss depending from said crown, said boss having laterally opposite sides and including a pocket commencing at at least one of said sides of said boss and extending laterally into said boss, said pocket being open to a bottom of said boss and being of substantially uniform size and shape over its lateral extent including at said at least one side; and
   a connecting rod having a small end disposed in said pocket.

2. The piston assembly of claim 1 wherein said small end has a width substantially equal to said width of said pocket.

3. The piston assembly of claim 1 wherein said pocket has a base formed by one of said sides of said boss, said base forming a wall that substantially closes off one of said sides of said pocket.

4. The piston assembly of claim 3 wherein said pocket has a width extending perpendicular to a central axis of said piston body from said at least one of said sides to said base, said width of said pocket being bisected by said central axis.

5. The piston assembly of claim 4 wherein said small end has a width substantially equal to the width of the pocket.

6. The piston assembly of claim 2 wherein said connecting rod shank with a width substantially equal to said width of said small end.

7. The piston assembly of claim 1 wherein said width of said opening is constant.

8. The piston assembly of claim 1 wherein said small end has an outer surface with a bearing material thereon.

9. A piston and connecting rod assembly, comprising:
   a piston body having an upper crown and a boss depending from said crown, said boss having laterally opposite sides and including a pocket commencing at at least one of said sides of said boss and extending laterally into said boss, said pocket being open to a bottom of said boss and being of substantially uniform size and shape over its lateral extent including at said at least one side; and a connecting rod having an end disposed in said pocket, said convex outer and carrying a bearing material thereon.

10. The piston assembly of claim 9 wherein said end has a width substantially equal to said width of said pocket.

11. The piston assembly of claim 9 wherein said pocket has a base formed by one of said sides of said boss, said pocket having a width extending perpendicular to a central axis of said piston body from said at least one of said sides to said base, said width of said pocket being bisected by said central axis.

12. The piston assembly of claim 9 wherein said end has a width substantially the same as the width of the pocket.

13. The piston assembly of claim 12 wherein said connecting rod has a shank with a width substantially the same as said width of said end.

14. The piston assembly of claim 9 wherein said width of said opening is constant.

15. A piston, comprising:

a piston body having an upper crown and a boss depending from said crown, said boss having laterally opposite sides and including a pocket commencing at at least one of said sides of said boss and extending laterally into said boss, said pocket being open to a bottom of said boss and being of substantially uniform size and shape over its lateral extent including at said at least one side.

16. The piston of claim 15 wherein said pocket has a closed off base formed by one of said sides of said boss.

17. The piston of claim 16 wherein said pocket has a width extending perpendicular to a central axis of said piston body from said at least one of said sides to said base, said width being bisected by said central axis.

18. The piston of claim 15 wherein said width of said opening is constant.

19. The piston of claim 15 wherein said piston body further comprises a pair of skirt portions depending from said upper crown.

20. The piston of said 19 wherein one of said skirt portions is spaced laterally from said pocket sufficiently for receipt of a small end of the connecting rod therein.

21. The piston of claim 15 wherein said piston body further comprises a pair of skirt portions depending from said upper crown on opposite sides of a horizontal axis of said piston body.

22. The piston of claim 21 wherein each of said skirt portions has an outer surface conforming to a cylinder bore and a cavity extending between said outer surface and said boss.

23. The piston of claim 22 wherein said cavities extend from said free end upwardly into said upper crown.

* * * * *